United States Patent [19]
Horibe et al.

[11] Patent Number: 6,041,469
[45] Date of Patent: Mar. 28, 2000

[54] DUST COLLECTOR WITH LONG FAN INCORPORATED THEREIN

[75] Inventors: Tatsutake Horibe, Sizuoka; Kazuhiko Sawaya, Shizuoka, both of Japan

[73] Assignee: Nisshinbo Industries, Inc., Tokyo, Japan

[21] Appl. No.: 08/961,197

[22] Filed: Oct. 30, 1997

[51] Int. Cl.$^7$ ...................................................... A47L 9/20
[52] U.S. Cl. ............................ 15/301; 15/309.1; 55/294; 55/338; 55/471
[58] Field of Search .................................. 15/301, 309.1; 55/294, 338, 471

[56] References Cited

U.S. PATENT DOCUMENTS

| | | | |
|---|---|---|---|
| 2,313,676 | 3/1943 | Shaver | 55/471 X |
| 2,347,334 | 4/1944 | Schmieg | 55/471 X |
| 3,080,695 | 3/1963 | Hay | 55/471 X |
| 3,233,391 | 2/1966 | Olsen | 55/294 X |
| 3,271,936 | 9/1966 | Dauge | 55/471 X |
| 3,667,093 | 6/1972 | Culpepper | 15/301 X |
| 4,719,662 | 1/1988 | Horak et al. | 15/301 |
| 4,905,340 | 3/1990 | Gutschmit | 55/471 X |
| 5,266,090 | 11/1993 | Burnett | 55/471 X |

FOREIGN PATENT DOCUMENTS

63557 6/1949 Netherlands .............................. 15/301

*Primary Examiner*—Chris K. Moore
*Attorney, Agent, or Firm*—Rogers & Killeen

[57] ABSTRACT

A dust collector which comprises a long suction fan and a movable filter adaptable to the fan and whose filter permits dust itself caught thereon to function as a three-dimensional filter to thereby enable collection of micro dust. The dust collector comprises: a long casing 1 having its one side wall formed with an opening 1a for sucking air and another side wall formed with an opening 1b for blowing air off, each of the openings 1a, 1b extending in the longitudinal direction of the casing 1; a built-in long cross flow fan 2 contained in the long casing 1; a large-sized cover-casing 11 containing the casing 1 with the opening 1b for blowing air off exposed to the outside and the opening 1a for sucking air concealed from the outside, the cover-casing 11 having its wall formed with an opening 11a in communication with the opening 1a for sucking air in the cover-casing 11, the cover-casing 11 being attached to a ceiling t or placed on a floor F of a building; and a screen filter 3 mounted on the cover-casing 11 for covering the opening 11a in the wall of the cover-casing 11.

10 Claims, 6 Drawing Sheets

DUST COLLECTOR WITH LONG FAN INCORPORATED THEREIN

BACKGROUND OF THE INVENTION

1. Field of the Invention

The present invention relates to a dust collector suitably used for collecting dust such as floating fuzz-like fine fibers and flue, in particular floating fuzz-like fine cotton fibers and cotton flue, around a spinning machine in a spinnery. In particular, it relates to a dust collector which is provided with a built-in long fan and thereby capable of exhibiting increased dust collecting effect.

2. Description of the Prior Art

In a spinnery, a production line is generally comprised of various spinning machines such as a roving frame and a spinning frame, auxiliary equipments and the like. In general, a dust collector is generally provided for each of such machines or such a production line for collecting floating fuzz-like fine fibers.

However, conventional dust collectors provided for spinning machines are variously constructed in accordance with the size, specifications and the like of models of the respective spinning machines. Accordingly, if the conventional dust collectors are elongated by adding an elongation or extended by connecting another one, it is required to prepare necessary constituent members, parts or the like which are specific to the models of the dust collectors and to differently assemble these into the elongated or extended dust collectors. This is very cumbersome and leads to a undesirably high cost. In particular, the conventional dust collectors are fabricated by bolting or screwing constituent members together. Consequently, the fabrication is laborious.

In the dust collectors, planar or belt-like movable filter are used. As a generally used conventional movable filter, there may be mentioned one which comprises a woven netting of 40 to 70 mesh, strip members laminated to both sides of the woven mesh to improve resistance to tensile force, and strip members having a width of about 20 mm and made of the same material as that of the side strip materials and provided at intervals of 300 to 500 mm in such a manner that they connect the side strip members to impart resistance to buckling to the netting. However, preparation of the filter involves many steps, and thus the filter is inevitably expensive. Further, from the viewpoint of the limit of strength of the netting under the lamination, a netting of fine mesh exceeding 70 cannot be employed. When fine dust such as fuzz-like fine fibers is collected, the dust unavoidably passes through the filter in part. Further, if fuzz-like fine fibers are deposited on the filter in a large amount, the deposited fuzz-like fine fibers are likely to fall off during the travel of the filter.

SUMMARY OF THE INVENTION

The present invention has been made in view of the problems of the conventional techniques. It is, therefore, an object of the present invention to provide a dust collector which comprises a long suction fan and a movable filter adaptable to the fan and whose filter permits dust itself caught thereon to function as a three-dimensional filter to thereby enable collection of more minute "micro dust".

According to the present invention which has been made to attain the above object, there is provided a dust collector with a long fan incorporated therein, the dust collector comprising:

a long casing having its one side wall formed with an opening for sucking air and another side wall formed with an opening for blowing air off, each of the openings extending in the longitudinal direction of the casing, a built-in long cross flow fan contained in the long casing, a large-sized cover-casing containing the casing with the opening for blowing air off exposed to the outside and the opening for sucking air concealed form the outside, the cover-casing having its wall formed with an opening in communication with the opening for sucking air in the cover-casing, the cover-casing being attached to a ceiling or placed on a floor of a building, and a screen filter mounted on the cover-casing for covering the opening in the wall of the cover-casing.

In the dust collector of the present invention, the suction fun incorporated in the long casing is actuated to generate a wind. The wind is blown off from the air outlet toward a floor, a machine base and the like to generate large circulating air flows. By the circulating air flows, dust such as fuzz-like fine fibers floating in air is entrained toward the air sucking inlet to deposit on the screen filter. The fuzz-like fine fibers and the like deposited on the filter are removed by intermittently or continuously moving the filter under suctional action of the suction nozzle.

DESCRIPTION OF THE PREFERRED EMBODIMENTS

Now, embodiments of the dust collector according to the present invention which is provided with a movable filter and a built-in long fan will be described with reference to the accompanying drawings.

Figure 1:
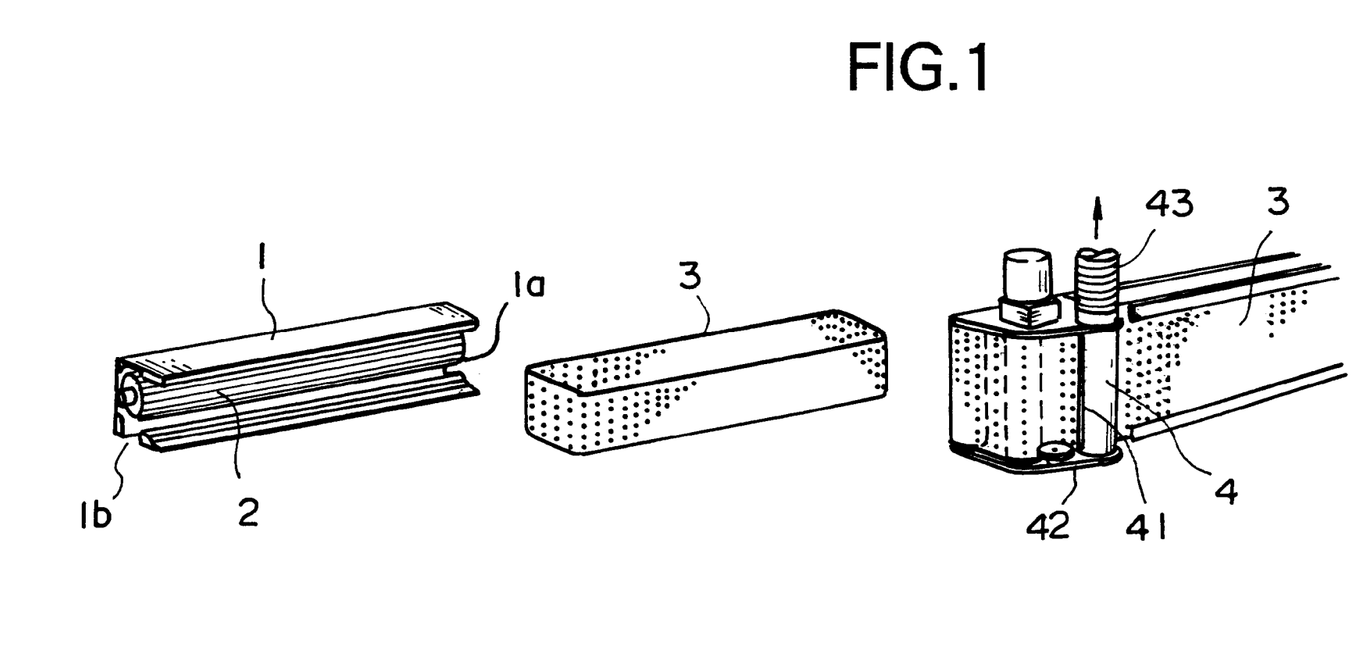
FIG. 1 is a perspective view showing constituent members of the dust collector according to the present invention.

In FIG. 1, reference number 1 represents a long casing having a substantially square tube-like shape, reference number 2 represents a built-in long cross flow fan contained in the long casing 1, reference number 3 represents a screen filter, and reference number 4 represents a suction nozzle provided facing the outer surface of the screen filter 3 for suction-removing fuzz-like fine fibers and the like deposited on the screen filter 3.

Figure 2:
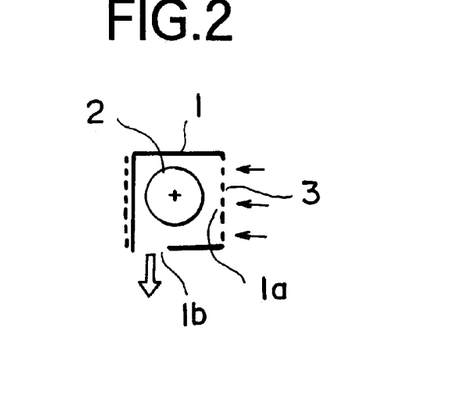
FIG. 2 is a cross-sectional view schematically showing cross-sectional structure of the first embodiment the dust collector according to the present invention.

FIG. 2 shows an embodiment of the dust collector which comprises a casing 1 having its bottom wall formed with a slit as an air outlet 1b along the longitudinal direction of the casing 1 and having its front wall formed with an opening as an air sucking inlet 1a, a built-in cross flow fan 2 contained in the casing 1, and a screen filter 3 put in such a manner that it intermittently or continuously travels around the air sucking inlet 1a of the casing 1. When the fan 2 is actuated, circulating air flows are generated which passe through the air sucking inlet 1a and then the air outlet 1b. By the circulating air flows, dust such as fuzz-like fine fibers is entrained to deposit on the screen filter 3 in front of the air sucking inlet 1a.

Figure 3:
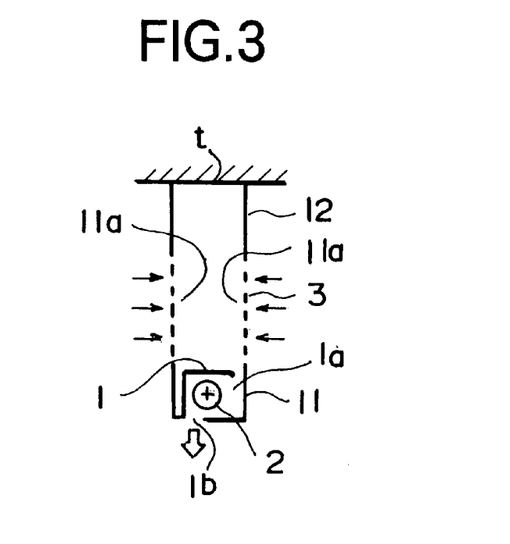
FIG. 3 is a cross-sectional view schematically showing cross-sectional structure of the second embodiment the dust collector according to the present invention.

FIG. 3 shows another embodiment of the dust collector which comprises a casing 1 having an air outlet 1b; a cover-casing 11 having a vertically long cross-section surrounding the casing 1 except for the air outlet 1b, and containing the casing 1 with the air outlet 1b positioned at the bottom of the cover-casing 11, having its front and rear sides formed with openings 11a, 11a as air intakes in middle portions thereof in terms of the height direction of the cover-casing 11, and having its upper end 12 attached to a ceiling t; a built-in fan 2 contained in the casing 1, and a screen filter 3 put in such a manner that it intermittently or continuously travels around the front and rear openings 11a, 11a. By actuating the fan 2, circulating air flows are generated by which dust such as fuzz-like fine fibers is entrained to deposit on both sides of the filter 3.

Figure 5:
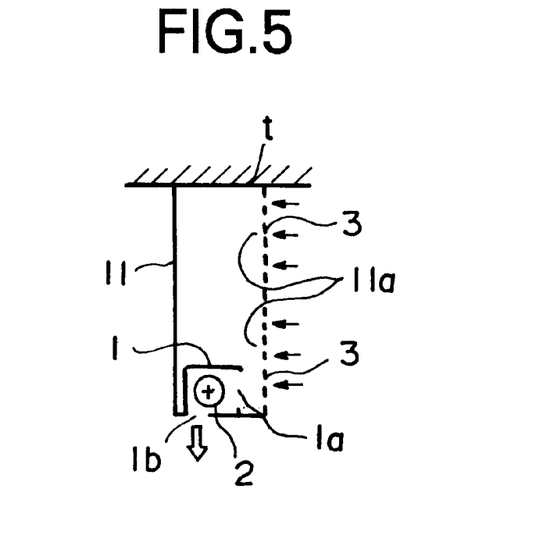
FIG. 5 is a cross-sectional view schematically showing cross-sectional structure of the fourth embodiment the dust collector according to the present invention.

In the dust collector in FIG. 3, the openings 11a, 11a are formed in the front and rear sides of the cover-casing 11. In the present invention, however, an opening or openings 11a, 11a may be formed only in the front side of the cover-casing 11. In this case, upper and lower screen filters 3, 3 are put in such a manner that they intermittently or continuously travel around the opening or openings 11a, 11a. By actuating a fan 2, circulating air flows are generated by which dust such as fuzz-like fine fibers is entrained to deposit on the filters 3. FIG. 5 illustrates such an embodiment of the dust collector.

Figure 4:
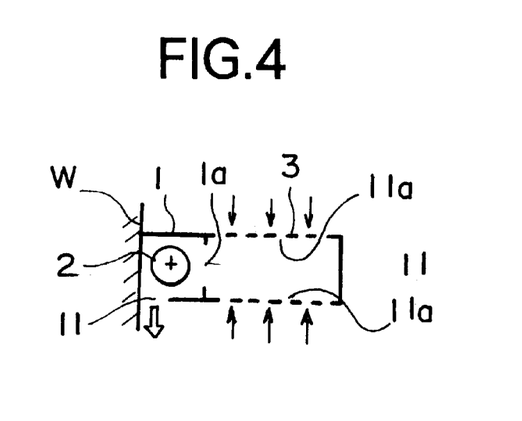
FIG. 4 is a cross-sectional view schematically showing cross-sectional structure of the third embodiment the dust collector according to the present invention.

FIG. 4 shows still another embodiment of the dust collector which comprises a casing 1 having an air outlet 1b; a cover-casing 1 1 having a horizontally long cross-section, having its lower side provided with an opening at which the air outlet 1b is positioned, and having its upper and lower sides formed with openings 11a, 11a; a built-in fan 2 contained in the casing 1; and a screen filter 3 put in such a manner that it intermittently or continuously travels around the upper and lower openings 11a, 11a. By actuating the fan 2, circulating air flows are generated by which dust such as fuzz-like fine fibers is entrained to deposit on upper and lower sides of the filter 3. This embodiment is suitably mounted on a wall W.

Figure 6:
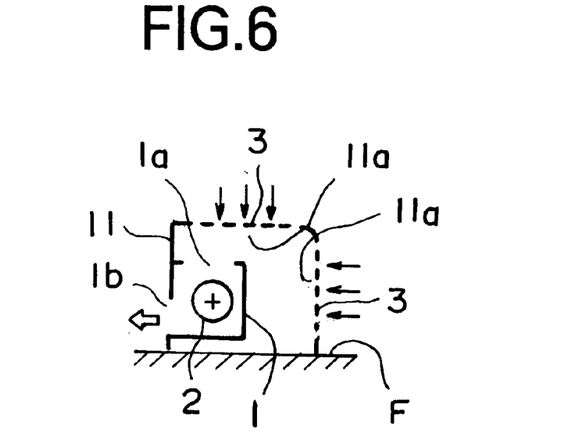
FIG. 6 is a cross-sectional view schematically showing cross-sectional structure of the fifth embodiment the dust collector according to the present invention.

FIG. 6 shows a further embodiment of the dust collector which comprises a horizontally long casing 1 so placed as to have its side wall formed with an air outlet 1b and its upper wall formed with an air sucking inlet 1a; a cover-casing 11 containing the casing 1 and having its upper and front walls formed with openings 11a, 11a; a built-in fan 2 contained in the casing 1; and a screen filter 3 covering the respective openings 11a, 11a and movable along the longitudinal direction of the cover-casing 11. A circulating air flow is generated By actuating the fan 2, circulating air flows are generated by which dust such as fuzz-like fine fibers is entrained to deposit on the filter 3. This embodiment is suitably placed on a floor F or the like.

In the embodiments of the dust collector in FIGS. 2 to 7, a suction nozzle 4 is disposed at an appropriate position close to the outer surface of each screen filter 3 to suction-remove dust such as fuzz-like fine fibers deposited on the filter 3 while intermittently or continuously moving the filter 3 around the air suction opening, although not shown in these Figs.

Figure 9:
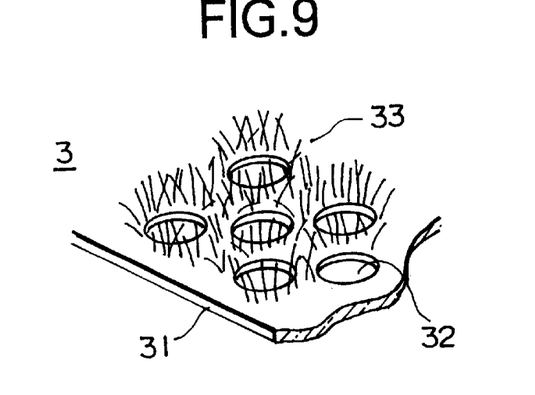
FIG. 9 is an enlarged perspective view showing the screen filter in part.
Figure 10:
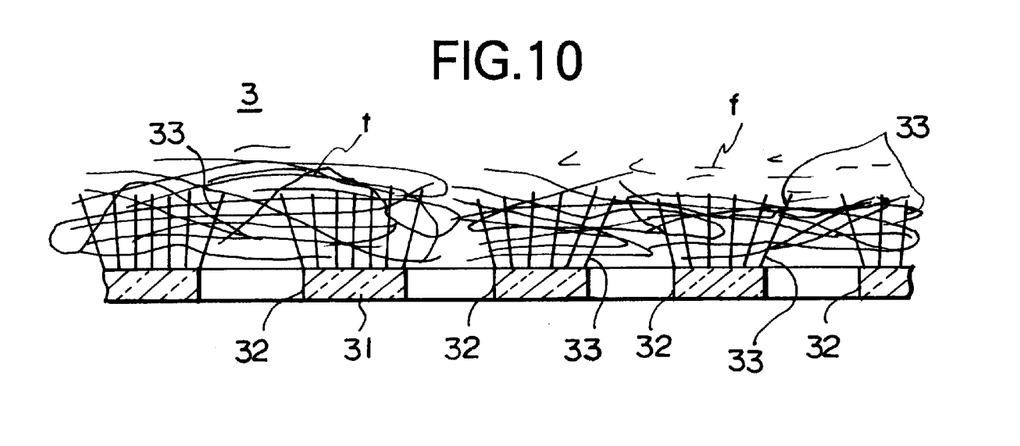
FIG. 10 is a sectional view of the screen filter with fuzz-like fine fibers deposited thereon.
Figure 11:
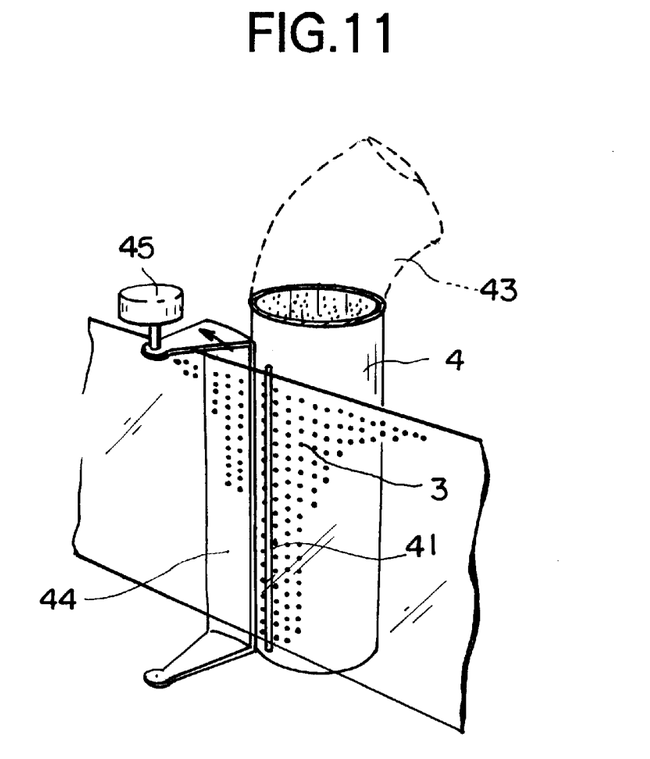
FIG. 11 is a perspective view showing structure of the suction nozzle and a shutter portion thereof.

As the casing 1, one prepared by, for example, extrusion molding of aluminum or a synthetic resin is used. As shown in FIGS. 9 and 10, the screen filter 3 comprises a belt-like substrate 31 made of a polyester film or the like and provided with a large number of fine holes 32 formed, for example, by punching and each having a diameter of about 1.5 mm to about 2.0 mm, and fine bristles 33 provided on the surface of the belt-like substrate 31 and made of a nylon or the like. The screen filter 3 is typically put around four shafts (not shown) rotatably supported at corners of the casing 1 or cover-casing 11 to thereby frontally cover the air sucking inlet 1a or 11a of the casing 1 or cover-casing 11, and it is intermittently or continuously travels around the shafts by appropriate driving means. By the action of the fan 2, dust f such as fuzz-like fine fibers is caught by the fine bristles 33. This leads to a smaller amount of dust f which passes through the fine holes 32, and the dust f thus caught does not fall off easily. Further, the surface of the filter 3 is covered with the dust f thus deposited thereon just as an unwoven fabric to form a three-dimensional secondary filter. By virtue of this, not only fuzz-like fine fibers but also more minute or micro dust are deposited and collected.

If fuzz-like fine fibers and the like are deposited on the screen filter 3 in a large amount to cause clogging, not only air blow-off rate of the fan 2 is decreased but also dust-retaining ability of the filter 3 is lowered. In view of this, it is desired that the filter 3 have an area as large as possible. The filter 3 is intermittently or continuously moved to stepwise or gradually remove the deposited fuzz-like fine fibers and the like by suction by means of the suction nozzle 4, thereby effecting dust collection.

For this purpose, as shown in FIG. 1 by way of an example, the suction nozzle 4 has its side wall provided with a nozzle slit 41 having substantially the same length as the width of the filter 3 at a position facing the dust such as fuzz-like fine fibers deposited on the filter 3. The suction nozzle 4 is attached to a mounting member 42 in the form of a bracket provided on the casing 1 or cover-casing 11 and protruding therefrom, and it is provided with a discharge pipe 43 connected to the top thereof so as to discharge collected fuzz-like fine fibers and more minute dust from the system.

Figure 7:
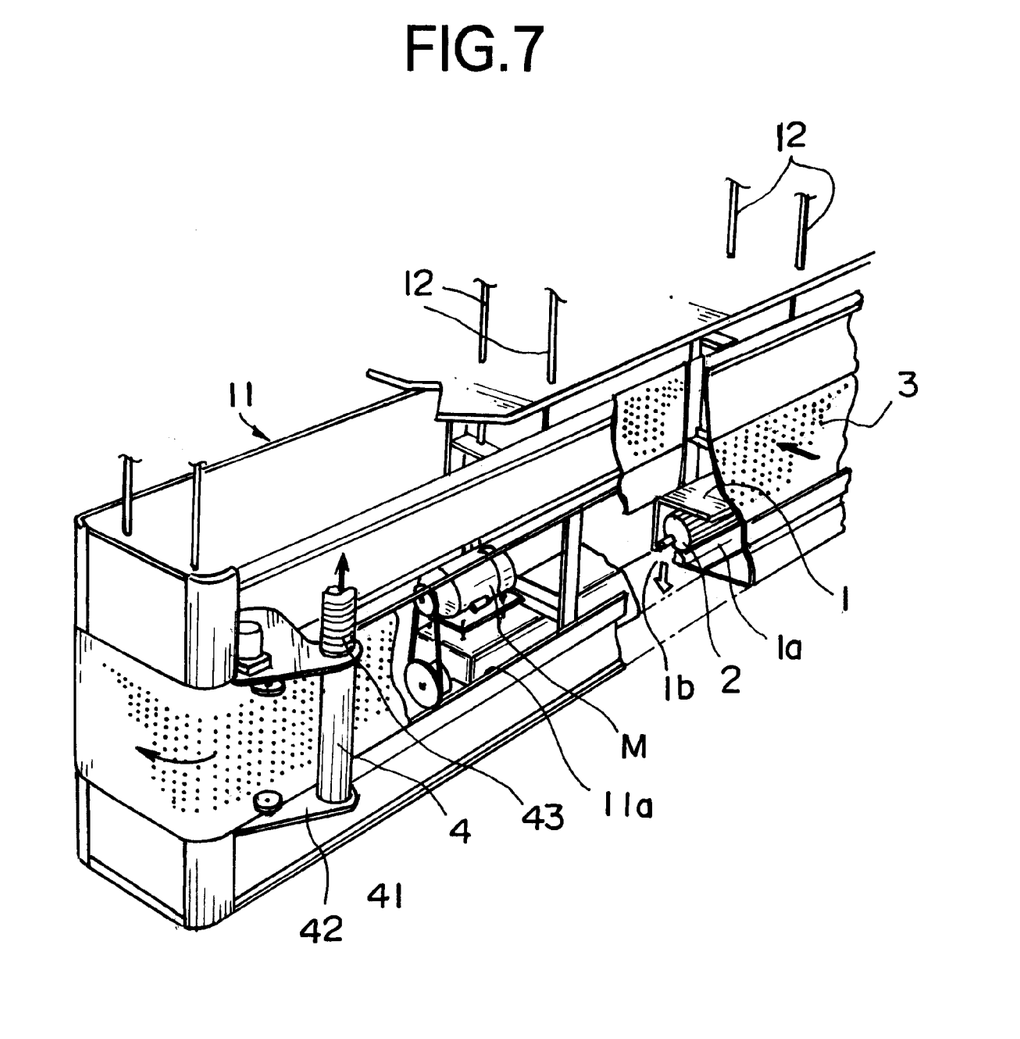
FIG. 7 is a perspective view of the embodiment of the present invention shown in FIG. 3.

FIG. 7 is a perspective view specifically showing the structure of the embodiment of the dust collector shown in FIG. 3 in cross-section. The long casing 1 prepared by extrusion molding of aluminum is so placed as to have its front wall formed with an opening as the air sucking inlet 1a and its bottom wall formed with a slit as the air outlet 1b. The built-in long fan 2 is contained in the casing 1, and the casing 1 is placed in the cover-casing 11. The cover casing 11 has its front and rear sides formed with openings 11 a, 11a, and the screen filter 3 is vertically put on the cover-casing 11 in such a manner that it intermittently or continuously travels around the front and rear openings 11a, 11a as air sucking inlets. The cover casing 11 has its upper end attached to a ceiling t or supported by appropriate supporting members 12. The suction nozzle 4 is so located outside the cover-casing 11 as to face the filter 3 and actuated in accordance with the intermittent or continuous travel of the screen filter 3 to suction-remove dust f such as fuzz-like fine fibers deposited on the filter 3.

Figure 8:
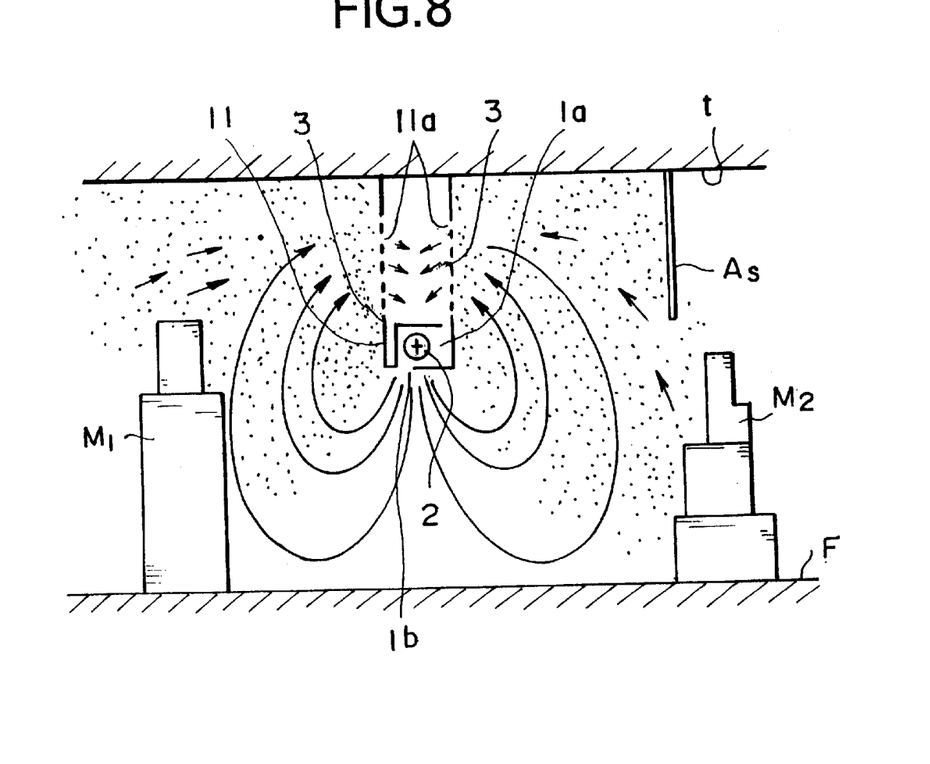
FIG. 8 is a side view showing air flows generated at a time when the dust collector in FIG. 7 is driven to collect fuzz-like fine fibers.

More specifically, as shown in FIG. 8, air blown off from the air outlet 1b makes circulating air streams by which dust f such as fuzz-like fine fibers floating in air is entrained. The circulating air streams flow toward the filter 3 and are sucked by the fan 2 to pass through the filter 3 while depositing the dust f and then blown off from the air outlet 1b of the casing 1. The air blown off from the air outlet 1b makes circulating air streams.

In a case where dust f such as fuzz-like fine fibers is removed stepwise, the filter 3 is intermittently moved while actuating the suction nozzle 4. In other words, when amount of the dust f deposited on the screen filter 3 reaches a predetermined amount, the filter 3 is moved under the action of the suction nozzle 4 to intermittently remove the dust f.

It is to be noted that the long casing 1 is generally composed of a plurality of casing units connected one after another so as to have a desired length. Each of the casing units is prepared by extrusion molding of aluminum, as described above, and has an appropriate unit length. Accordingly, both of the air suction inlet 1a and the air outlet 1b are formed along the longitudinal direction of the casing 1. Likewise, the fan 2 is generally composed of a plurality of fan units which are contained in the respective casing units and connected one after another. The fan unit preferably has the same unit length as that of the casing unit. The fan 2 is driven by a single motor M.

In conjunction with the dust collector according to the present invention, an air flow separating plate As may be provided in a spinnery or the like in order to effectively generate air flows by driving the fan 2, as shown in FIG. 10 by way of an example. In FIG. 10, M1 and M2 are spinning machines. The dust collector of the present invention may be used for other purposes than dust-collecting purpose. For example, an appropriate number of the dust collectors are attached to a ceiling of an underground parking lot with their screen filters 3 removed and the fans 2 are actuated to generate circulating air flows, thereby enabling efficient ventilation of the underground parking lot. This is extremely desirable from the view points of safety and health.

The present invention is as described above, and therefore, the dust collector comprises:

a long casing having its one side wall formed with an opening for sucking air and another side wall formed with an opening for blowing air off, each of the openings extending in the longitudinal direction of the casing, a built-in long cross flow fan contained in the long casing, a screen filter for receiving circulating air flows generated by actuation of the long fan flowing from the outside to the inside of the casing to catch dust such as fuzz-like fine fibers and more minute fuzz-like fibers entrained by the air flows, and a suction nozzle placed at an appropriate position facing outer surface of the screen filter for collecting the fuzz-like fine fibers and the like caught by the filter. Accordingly, the dust collector can be formed into a slender shape as a whole. By virtue of this, installation of the dust collector does not require a large space. Therefore, it can be installed, for example, near a fuzz-like fine fiber generating source in a spinnery, thereby efficiently collecting fuzz-like fine fibers and the like.

Further, if each of the casing, fan and screen which are long is composed of units standardized in shape and size, a dust collector having a desired length is obtained using the same units. This leads to increased compatibility and flexibility. For example, such a dust collector can be used for various types or models of spinning machines installed in a spinnery beyond the types or models. Further, since the dust collector as a whole has a simple structure encapsulated in the long cover-casing, it can be installed with ease and provided at a low cost. Therefore, the dust collector is preferably used in a factory in which fine dust such as fuzz-like fine fibers is generated, for example, in a spinnery.

What is claimed is:

1. A dust collector with a long fan incorporated therein, said dust collector comprising:

a long casing having one side wall formed with an opening for sucking air and another side wall formed with an opening for blowing air out, each of said openings extending in the longitudinal direction of the casing, a long cross flow fan contained in the long casing, a large-sized cover-casing containing the casing with the opening for blowing air out exposed to the outside and the opening for sucking air concealed from the outside, said cover-casing having its wall formed with an opening in communication with the opening for sucking air in said cover-casing, said cover-casing being attached to a supporting structure of a building, and a screen filter mounted on said cover-casing for covering said opening in the wall of said cover-casing, wherein said screen filter is movably mounted on said cover-casing.

2. A dust collector with a long fan incorporated therein, said dust collector comprising:

a long casing having one side wall formed with an opening for sucking air and another side wall formed with an opening for blowing air out, each of said openings extending in the longitudinal direction of the casing, a long cross flow fan contained in the long casing, a large-sized cover-casing containing the casing with the opening for blowing air out exposed to the outside and the opening for sucking air concealed from the outside, said cover-casing having its wall formed with an opening in communication with the opening for sucking air in said cover-casing, said cover-casing being attached to a supporting structure of a building, and a screen filter mounted on said cover-casing for covering said opening in the wall of said cover-casing, wherein a suction nozzle is disposed adjacent to said screen filter for suction-removing fuzz-like fine fibers caught by said screen filter.

3. The dust collector according to claim 1, wherein said long cross flow fan and said casing containing therein said fan are respectively composed of cross flow fan units each having a unit length and casing units each having the same unit length as that of said fan unit, said fan units and said casing units being respectively connected one after another in an appropriate number so as to obtain a desired length of said dust collector.

4. The dust collector according to claim 3, wherein said screen filter comprises a substrate made of a synthetic resin film and formed with a large number of fine holes, and nylon pile bristles provided thereon.

5. A dust collector with a long fan incorporated therein, said dust collector comprising:

a long casing having one side wall formed with an opening for sucking air and another side wall formed with an opening for blowing air out, each of said openings extending in the longitudinal direction of the casing, a long cross flow fan contained in the long casing, a large-sized cover-casing containing the casing with the opening for blowing air out exposed to the outside and the opening for sucking air concealed from the outside, said cover-casing having its wall formed with an opening in communication with the opening for sucking air in said cover-casing, said cover-casing being attached to a supporting structure of a building, and a screen filter mounted on said cover-casing for covering said opening in the wall of said cover-casing, wherein said screen filter comprises a substrate made of a, synthetic resin film and formed with a large number of fine holes, and nylon pile bristles provided thereon.

6. The dust collector according to claim 1, wherein a suction nozzle is disposed adjacent to said screen filter for suction-removing fuzz-like fine fibers caught by said screen filter.

7. The dust collector according to claim 1, wherein said long cross flow fan and said casing containing therein said fan are respectively composed of cross flow fan units each having a unit length and casing units each having the same unit length as that of said fan unit, said fan units and said casing units being respectively connected one after another in an appropriate number so as to obtain a desired length of said dust collector.

8. The dust collector according to claim 1, wherein said screen filter comprises a substrate made of a synthetic resin film and formed with a large number of fine holes, and nylon pile bristles provided thereon.

9. The dust collector according to claims 2, wherein said long cross flow fan and said casing containing therein said fan are respectively composed of cross flow fan units each having a unit length and casing units each having the same unit length as that of said fan unit, said fan units and said casing units being respectively connected one after another in an appropriate number so as to obtain a desired length of said dust collector.

10. The dust collector according to claim 2, wherein said screen filter comprises a substrate made of a synthetic resin film and formed with a large number of fine holes, and nylon pile bristles provided thereon.

* * * * *